(12) United States Patent
Shepherd

(10) Patent No.: US 7,497,628 B2
(45) Date of Patent: Mar. 3, 2009

(54) TILT PAD BEARING ASSEMBLY

(75) Inventor: Andrew Shepherd, Branston (GB)

(73) Assignee: Siemens Aktiengesellschaft, Munich (DE)

( * ) Notice: Subject to any disclaimer, the term of this patent is extended or adjusted under 35 U.S.C. 154(b) by 326 days.

(21) Appl. No.: 10/559,862

(22) PCT Filed: Apr. 8, 2004

(86) PCT No.: PCT/EP2004/003766

§ 371 (c)(1),
(2), (4) Date: May 23, 2006

(87) PCT Pub. No.: WO2004/109132

PCT Pub. Date: Dec. 16, 2004

(65) Prior Publication Data

US 2006/0239596 A1  Oct. 26, 2006

(30) Foreign Application Priority Data

Jun. 7, 2003 (GB) .................................. 0313134.9
Jun. 17, 2003 (GB) .................................. 0313929.2

(51) Int. Cl.
*F16C 17/03* (2006.01)
(52) U.S. Cl. ........................................ 384/309; 384/312
(58) Field of Classification Search .................. 384/92, 384/215, 308–312, 302–304
See application file for complete search history.

(56) References Cited

U.S. PATENT DOCUMENTS

| | | | | |
|---|---|---|---|---|
| 3,787,105 A | | 1/1974 | Gardner | |
| 3,936,103 A | * | 2/1976 | Byrns et al. | 384/312 |
| 3,953,150 A | * | 4/1976 | Onal | 416/184 |
| 3,985,405 A | * | 10/1976 | Okano et al. | 384/117 |
| 4,026,613 A | | 5/1977 | Moravchik | |
| 4,568,204 A | * | 2/1986 | Chambers | 384/309 |
| 4,686,403 A | * | 8/1987 | Hackstie et al. | 384/310 |
| 4,714,357 A | | 12/1987 | Groth et al. | |
| 5,013,947 A | * | 5/1991 | Ide | 384/309 |
| 5,288,153 A | * | 2/1994 | Gardner | 384/311 |
| 5,421,655 A | * | 6/1995 | Ide et al. | 384/99 |
| 5,634,725 A | * | 6/1997 | Chester | 384/117 |
| 5,743,657 A | * | 4/1998 | O'Reilly et al. | 384/312 |
| 5,795,076 A | | 8/1998 | Ball et al. | |
| 6,099,271 A | * | 8/2000 | Brookbank | 384/309 |
| 6,499,883 B2 | * | 12/2002 | Miller | 384/308 |
| 6,623,164 B1 | * | 9/2003 | Gozdawa | 384/119 |
| 2004/0240759 A1 | * | 12/2004 | Swann et al. | 384/309 |

* cited by examiner

Primary Examiner—Marcus Charles

(57) ABSTRACT

Disclosed is a radial tilt pad bearing assembly comprising: an outer carrier; a plurality of tilt pads retained within the outer carrier; and a corresponding plurality of retaining pins to retain the tilt pads in given circumferential positions, each fixed in the bearing assembly outer carrier so as to abut a side face of a cavity in the corresponding tilt pad. At least one retaining pin and the corresponding cavity are respectively shaped such that, when in use, a clearance in a plane transverse to the axes of the bearing assembly and the tilt pad between the retaining pin and the side face is lesser at a first location which lies substantially at the inner surface of the carrier, than at all corresponding locations at radially inner portions of the side face, with respect to the first location. A contact point between the retaining pin and the tilt pad when in use, lies substantially at the inner surface of the outer carrier. The tilt pad is accordingly able to tilt without being substantially displaced circumferentially about the outer carrier. Further disclosed is a retaining pin for use in such a bearing system.

13 Claims, 7 Drawing Sheets

Prior Art

TILT PAD BEARING ASSEMBLY

CROSS REFERENCE TO RELATED APPLICATION

This application is the US National Stage of International Application No. PCT/EP2004/003766, filed Apr. 8, 2004 and claims the benefit thereof. The International Application claims the benefits of British Patent application No. 0313134.9 GB filed Jun. 7, 2003, and British Patent application No. 0313929.2 GB filed Jun. 17, 2003, all of the applications are incorporated by reference herein in their entirety.

FIELD OF THE INVENTION

The present invention relates to bearings such as used to support a rotor of an engine within a gas turbine. In particular, it relates to mechanical means for the retention of tilting pads in radial tilt pad bearings.

BACKGROUND OF THE INVENTION

Gas turbine engine rotor shaft bearing assemblies may be of the plain bearing type which are segmented (radially self-aligning), retained in an outer carrier, oil pressure lubricated and known as tilt pad bearings. Such bearings are subject to high speed and load when the engine is running and very small out of limit wear in a bearing can have disastrous effects on an engine. It may cause engine shut-down which, for this kind of engine, is usually a very costly matter. For acceptable engine life it is therefore vital that the bearings perform reliably.

It is typical in such segmented plain bearing arrangements to restrain circumferential movement of each segment by use of retaining pins which are fixed in the bearing assembly outer carrier and abut to segments either at segment end faces or at the side face of an internal hole or passage in the segment body. The pin may be a parallel round pin throughout its length, but a known variation is for a pin with spheroid tip on a round pin stem, the sphere diameter being greater than the round pin stem.

It has been found that at contact faces between the bearing segments and bearing outer carrier, fretting wear may occur which allows segments to move beyond design limits and thus cause bearing related engine problems. It is believed the fretting is caused by a small amount of circumferential sliding action under pressure between segment and carrier and that the action is made possible with prior art pin designs.

SUMMARY OF THE INVENTION

The subject invention aims to reduce the sliding action and so also reduce the fretting wear.

FIG. 1 shows an example of a known tilt pad radial bearing assembly 10, such as a TJ series bearing manufactured by Waukesha Bearings of Wisconsin, USA. The tilt pad bearing assembly is shown 10 fully assembled on the right hand side of the drawing, and partially dismantled 10' on the left hand side of the drawing. Each bearing assembly comprises an outer carrier 12, containing a plurality of tilt pads 14. As may be seen more clearly from the tilt pad in isolation towards the bottom right of the drawing, each tilt pad 14 is shaped as a section of a hollow cylinder. The external radius R of the tilt pads is somewhat smaller than the internal radius R' of the carrier 12. This allows the tilt pads to rock within the carrier 12, maintaining contact with the carrier only along a single linear contact region, parallel to the axes A, A' of the tilt pad and the carrier. As can be seen from the partially dismantled assembly 10', the carrier 12 may include lip 16 for retaining the tilt pads in one axial direction. Retaining plates 18 may be affixed to the other axial extremity of the assembly to retain the tilt pads in the other axial direction. Retaining pins 20 are provided, to retain the tilt pads in a given circumferential position. Directions A, A' show respective axial directions of the tilt pad 14 and the bearing 10'.

FIG. 2 shows a detail of the system of FIG. 1 in operation. A turbine motor rotor (not shown) supported by the radial tilt pad bearing assembly rotates in an anti-clockwise direction as shown by arrow 22. Friction acting between the rotor and the tilt pad 14 causes the pad to press against the retaining pin 20. The tilt pad 14 tends to tilt in operation, depending on factors such as the speed of rotation of the rotor and out of balance forces. The tilt pad may tilt from the position shown in a solid line towards the position shown as a dotted line. The leading edge 24 of the tilt pad is restrained by the retaining pin 20 and so cannot adopt the position 24', but rather must acquire an equivalent position 24" displaced radially outward from the initial position 24, but displaced circumferentially about the carrier 12 with respect to position 24', in a direction opposite to the direction 22 of rotation of the rotor. While a displacement of the tilt pad 14 to the position which would have placed the leading edge in position 24' would have been a simple rocking movement causing no frictional movement between the pad 14 and the carrier 12, the fact of retaining the pad by pin 20 and forcing the pad 14 to adopt the position where the leading edge adopts position 24" causes a frictional relative displacement of the pad 14 around the circumference of the carrier 12 of a distance shown as Df.

Later, during operation of the rotor, the pad 14 may be called upon to tilt back to the position shown at 24. An unbalanced shaft will cause the pad to rock back and forth once for each revolution, which for a gas turbine may be in the region of 17,000 cycles per minute. This will again cause a frictional displacement of distance Df of the pad 14 on the carrier 12, but in the opposite direction. The distance Df is typically small, and in one example has been calculated as 8.7 μm. However, the wear caused by this frictional movement can become significant, considering the frequency of repetition of the frictional displacement, and the high mechanical load typically applied between the pad 14 and the carrier 12. The retaining pin 20 may be a cylindrical pin, similar to that shown in FIG. 1, or may be elongate in the axial direction, A'.

FIG. 4 shows a detail of another type of known tilt pad radial bearing assembly, which differs from the one shown in FIG. 1 in that the tilt pads 14 are restrained against circumferential motion by a retaining pin 30 located in a cavity 28 formed in the outer surface of the tilt pad 14. In this example, an enlarged head is provided on the retaining pin. The head may be spherical, or spheroid, atop a cylindrical pin. Alternatively, the head may be cylindrical atop an axially elongate pin 30.

In use, the turbine motor rotor (not shown) supported by the radial tilt pad bearing assembly rotates in the anti-clockwise direction 22. Friction acting between the rotor and the tilt pad 14 causes the interior surface of the cavity 28 to press against the retaining pin 30 at contact point 34. The tilt pad tends to tilt in operation, depending on factors such as the speed of rotation of the rotor and unbalanced forces. The tilt pad may tilt from the position shown in a solid line towards the position shown as a dotted line. The trailing edge 38 of the cavity 28 of the tilt pad is restrained by the retaining pin 30 and so cannot adopt the position 34', but rather must acquire an equivalent position 34" displaced circumferentially about the carrier 12 in a direction opposite to the direction 22 of rotation of the rotor. While a displacement of the tilt pad 14 to the position which would have placed the trailing edge in position 34' would have been a simple rocking movement causing no frictional movement between the pad 14 and the carrier 12, the fact of retaining the pad by pin 30 and forcing the pad 14 to adopt the position where the trailing edge adopts position 34" causes a frictional relative displacement of the pad 14 around the circumference of the carrier 12 of a distance shown as D'f.

Later, during operation of the rotor, the pad 14 may be called upon to tilt back to the position shown at 34. This will again cause a frictional displacement of distance D'f of the pad 14 on the carrier 12, but in the opposite direction. The distance D'f is typically small, and in one example has been calculated as 3.6 µm. However, the wear caused by this frictional movement can become significant, considering the frequency of repetition of the frictional displacement, and the high mechanical load typically applied between the pad 14 and the carrier 12.

The degree of wear which occurs on the pads 14 and the carrier 12 varies with many factors, presently believed to include the number of running hours and the number of starts performed with the pads, the engine, bearing and pad type and design, the hardness of the carrier and pad materials, the clearance of the bearing, the surface finish of the bearings and the degree of imbalance and vibration in the overall system when in use.

The consequences of the pad and/or carrier wear include an increase in bearing clearance, leading to reduced stiffness and damping of the bearing, reduced tolerance to unbalance and other exciting forces. The increased bearing clearance may lead to increased shaft vibration. Wear of the pads and/or carrier will also lead to increased maintenance costs and increased down-time.

The single most influential factor in fretting is believed to be the amplitude of the frictional displacement Df, D'f ("surface sliding"). Further factors include material hardness, surface finish, contact pressure, and any lubrication applied. FIGS. 3A-3B show the transition from a machined surface, illustrated at the right-hand side of FIG. 3A, to a fretted surface, similar to that illustrated in FIG. 3B for comparison. FIGS. 3A and 3B are not to the same scale.

The present invention aims to alleviate the occurrence of fretting wear on radial tilt pad bearings, and accordingly provides a radial tilt pad bearing assembly comprising an outer carrier; a plurality of tilt pads retained within the outer carrier and a corresponding plurality of retaining pins to retain the tilt pads in given circumferential positions, each fixed in the bearing assembly outer carrier so as to abut a side face of a cavity in the corresponding tilt pad. At least one retaining pin and the corresponding cavity are respectively shaped such that, when in use, a clearance in a plane transverse to the axes of the bearing assembly between the retaining pin and the side face of the cavity is lesser at a first location which lies substantially at the inner surface of the carrier, than at all corresponding locations at radially inner portions of the side face, with respect to the first location. A contact point between the retaining pin and the tilt pad when in use, lies substantially at the inner surface of the outer carrier. The tilt pad is accordingly able to tilt without being substantially displaced circumferentially relative to the outer carrier.

The retaining pin may have a tapered cross-section in a plane transverse to the axes of the bearing assembly and the tilt pad. Taper angles α on both sides of the cross-section of the retaining pin may be equal.

The cavity may be shaped to have a lesser dimension in a plane transverse to the axes of the bearing assembly and the tilt pad at the first location, than at all corresponding locations at radially inner portions of the side face, with respect to the first location.

The cavity may have a tapered cross-section in a plane transverse to the axes of the bearing assembly and the tilt pad. Taper angles on both sides of the cross-section of the cavity may be equal.

The retaining pin and the cavity may each be elongate in the axial direction of the tilt pad and the bearing assembly.

The cavity may occupy only a part of the axial extent of the tilt pad, the retaining pin having a compatible axial dimension.

The retaining pin may be pyramidal in shape. Such pyramid may have a square or rectangular base. Such pyramid may be truncated.

The retaining pin may be conical or truncated-conical in shape.

More than one combination of cavity and pin may be provided on each tilt pad, aligned in the axial direction of the pad and the bearing assembly.

BRIEF DESCRIPTION OF THE DRAWINGS

The above, and further, objects, advantages and characteristics of the present invention will be more clearly understood with reference to the following description of certain embodiments thereof, in conjunction with the accompanying drawings, wherein.

DETAILED DESCRIPTION OF THE INVENTION

Figure 5:
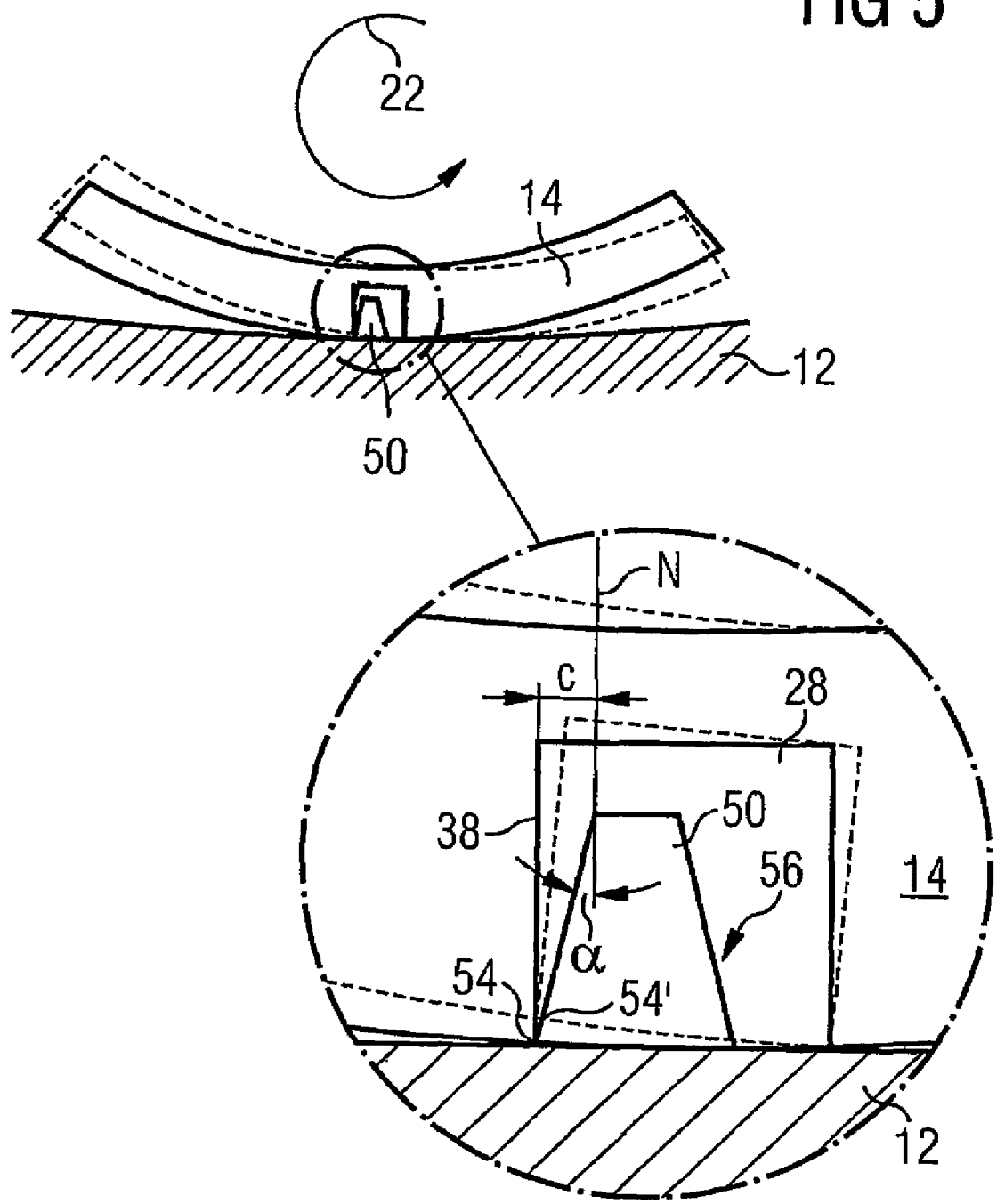
FIGS. 5-8 show examples of respective parts of tilt pad bearing assemblies of the present invention.

As illustrated in FIG. 5, the present invention provides an improved radial tilt pad bearing assembly, in which an improved tilt pad retaining pin 50 and cavity 28 is provided.

In use, the turbine motor rotor (not shown) supported by the radial tilt pad bearing assembly rotates in the anti-clockwise direction 22. Friction acting between the rotor and the tilt pad 14 causes the interior surface of the cavity 28 to press against the retaining pin 50 at contact point 54. Retaining pin 50 is shaped such that the contact point 54 lies substantially at the surface of the carrier 12. As illustrated in FIG. 5, the retaining pin 50 has a tapered cross-section in a plane transverse to the axes A, A' of the bearing 12 and the pad 14. A clearance c between the retaining pin 50 and the trailing edge 38 of the cavity is greater at all locations radially inwards from contact point 54.

Figure 1:
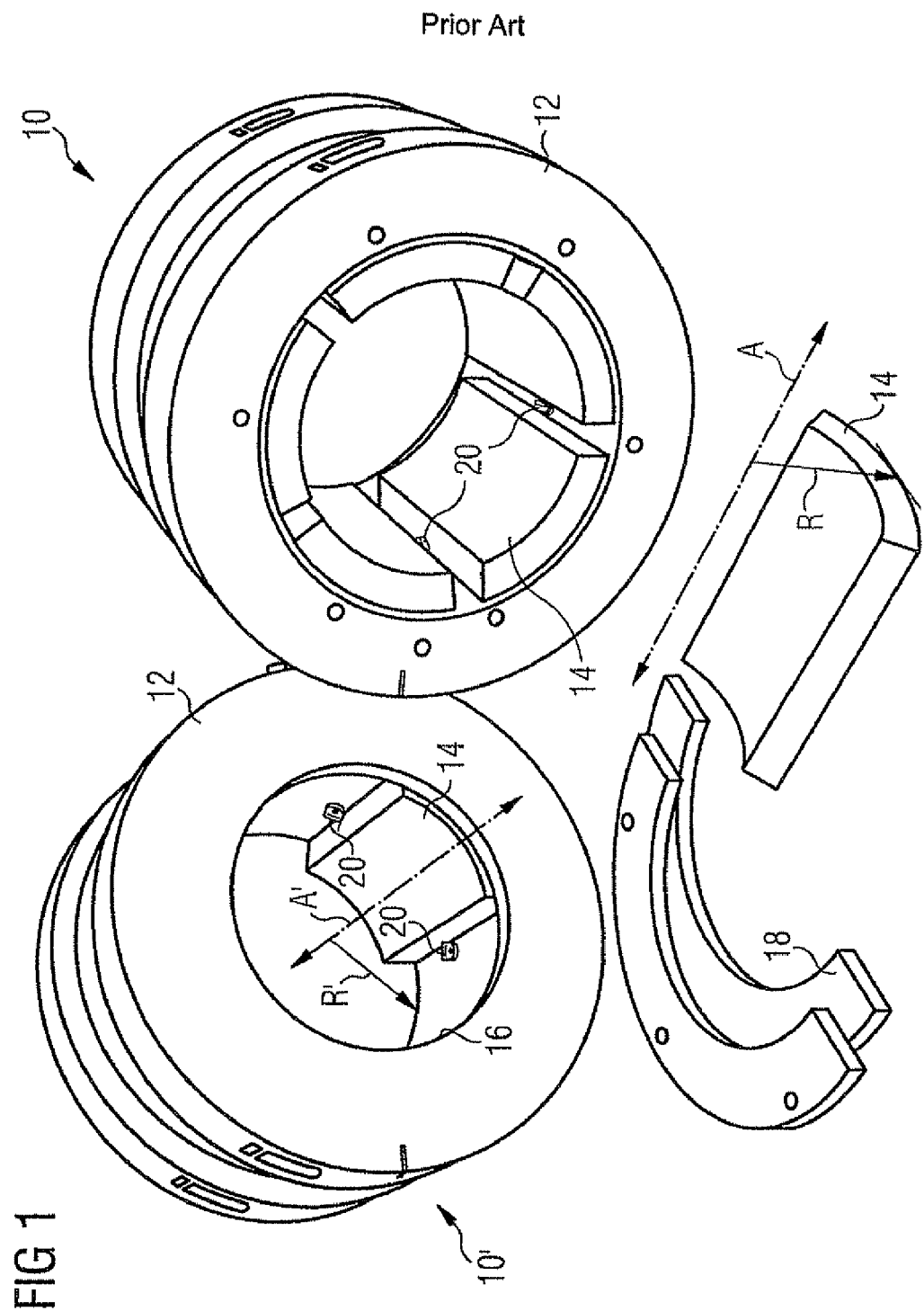
FIG. 1 shows a known tilt pad bearing assembly.
Figure 2:
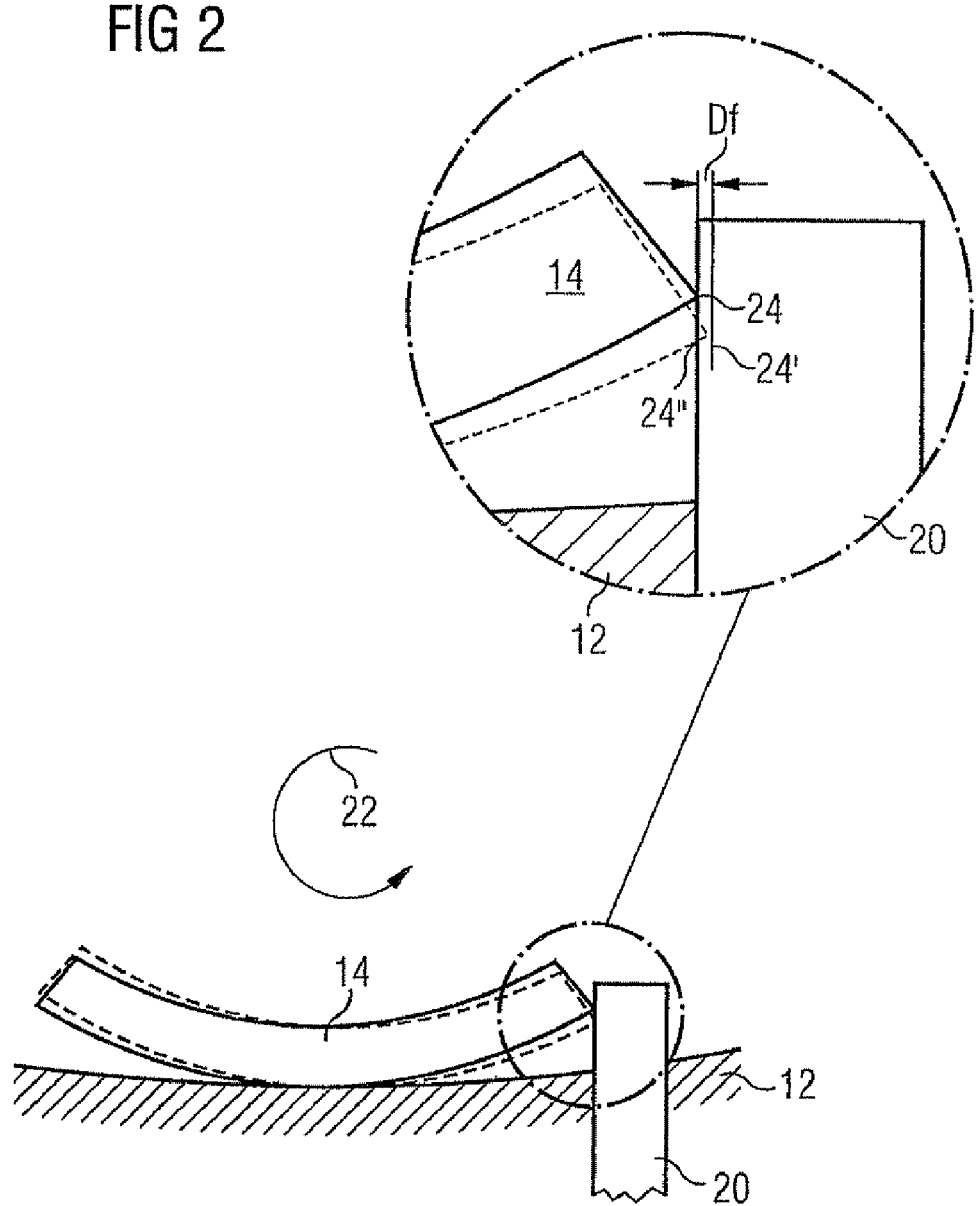
FIG. 2 shows an example of part of a tilt pad bearing assembly of the prior art.
Figure 3A:
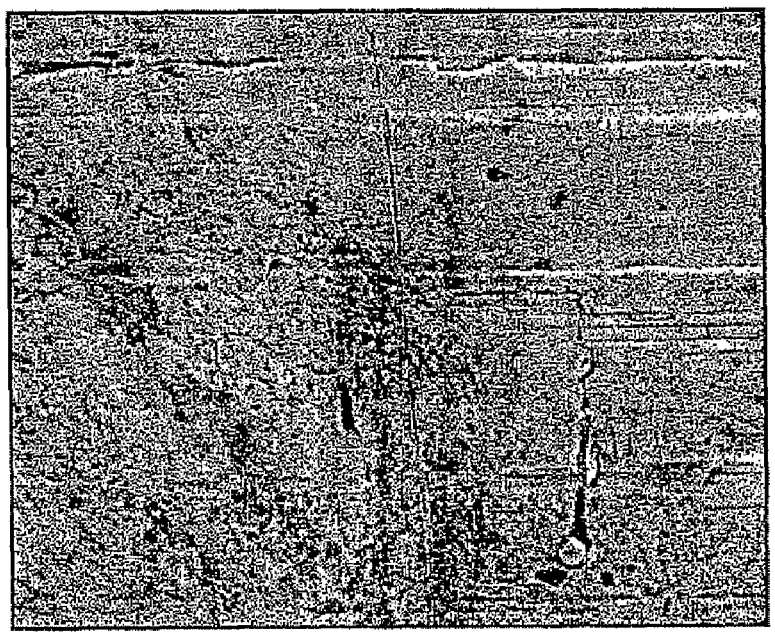
FIGS. 3A-3B show examples of wear to tilt pads.
Figure 3B:
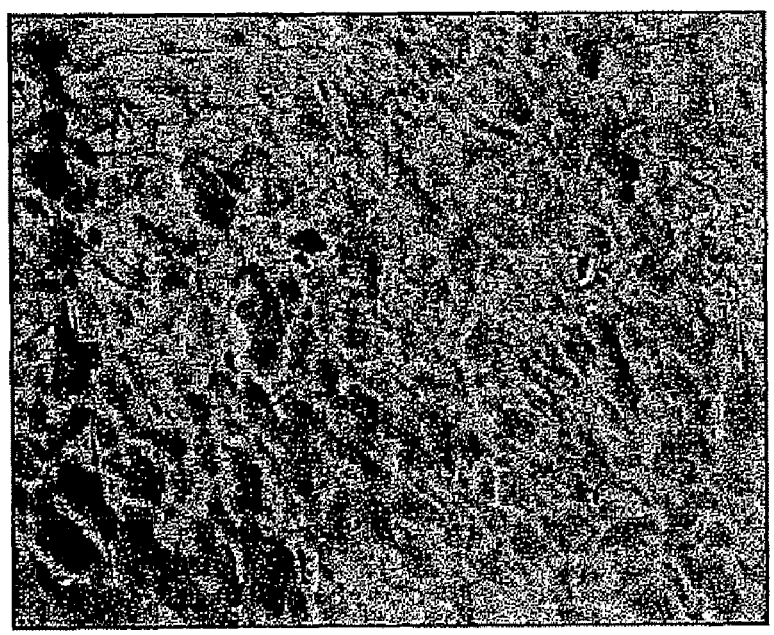
Figure 4:
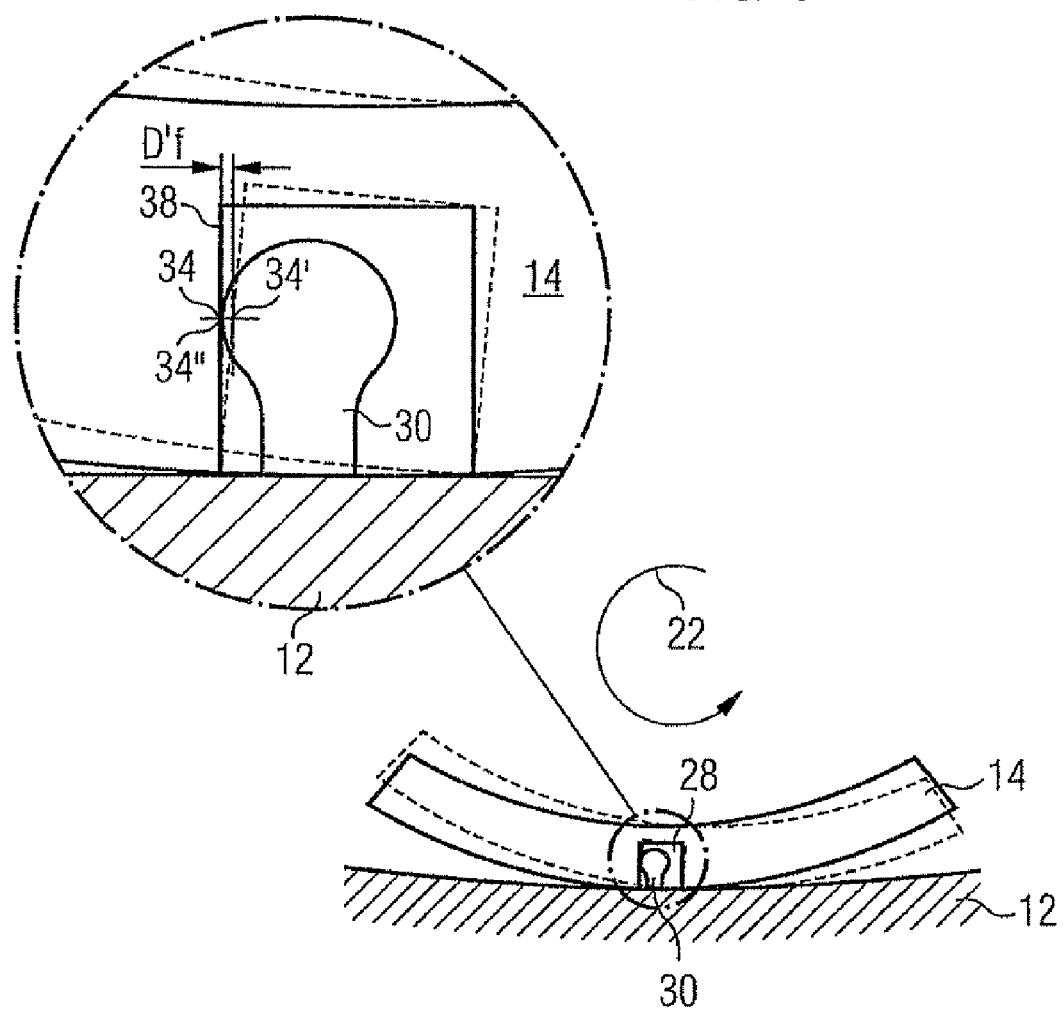
FIG. 4 shows an example of part of a tilt pad bearing assembly of the prior art.

The tilt pad tends to tilt in operation, depending on factors such as the speed of rotation of the rotor and unbalanced forces. The tilt pad 14 may tilt from the position shown in a solid line towards the position shown as a dotted line. Due to the inventive profile of the retaining pin 50, the point of contact 54 seeks to move to a new location 54' with the tilting of the pad 14. In contrast to the prior art systems of FIGS. 2 and 4, and due to the inventive profile of the retaining pin 50, the point of contact is permitted to substantially take up the desired position 54'. The pad is accordingly able to tilt substantially without being displaced circumferentially about the carrier 12. Accordingly, the displacement of the tilt pad 14 to the position where the contact point is in position 54' is a simple rocking movement causing substantially no frictional movement between the pad 14 and the carrier 12.

Later, during operation of the rotor, the pad 14 may be called upon to tilt back to the position shown at 54. This will again be possible, due to the inventive profile of the retaining pin 50, substantially without the pad being displaced circumferentially about the carrier 12, and so also without a frictional displacement of the pad 14 on the carrier 12.

In an embodiment of the invention, the retaining pin 50 and the cavity 28 may each be elongate in the axial direction of the bearing system. The cavity 28 may occupy only a part of the axial extent of the tilt pad 14, with the retaining pin 50 having a compatible axial dimension. The pin 50 may be pyramidal in shape. Such pyramid may have a square or rectangular base. The pyramid may be truncated. The pin may be conical or truncated-conical in shape.

More than one such combination of cavity and pin may be provided on each tilt pad. Such plurality of combinations of cavities and pins are preferably aligned in the axial direction of the pad 14 and the bearing 10.

The angle of the taper α of the profile of retaining pin 50, measured with reference to the normal N to the carrier 12, is important. If the angle of taper α approaches too closely the normal N to the carrier 12, the tilt pad may not be able to tilt without reintroducing a significant frictional displacement, impairing the achievements of the objectives of the invention. If the angle of taper α becomes too small, the trailing edge 38 of cavity 28 may contact the pin 50 at a radially inner point than points 54, 54' shown in FIG. 5. The lower limit to the taper angle α is thus provided by the requirement that the trailing edge 38 of cavity 28 should contact the pin 50 only substantially at the outer circumference of the tilt pad 14. If the trailing edge 38 contacts pin 50 at any radially inner point of pin 50, that is to say any deeper within cavity 28, then there is a risk that an unacceptable amount of frictional circumferential movement may be re-introduced, the problem of fretting wear will not be substantially alleviated, and the objectives of the present invention will not be achieved.

On the contrary, If the angle of taper α increases too far from the normal N to the carrier 12, the tilt pad may travel a frictional distance in the same direction as the rotor movement 22 when tilting as shown in FIG. 5. This would reintroduce a significant frictional displacement, impairing the achievements of the objectives of the invention.

The limits to the useful range of taper angles for the profile of the retaining pin 50 may be deduced by simple routine experiment, or by calculation.

The taper angles α on both sides of the profile of the retaining pin 50 are preferably equal, particularly in applications where the rotation direction 22 of the rotor may change. In applications where the rotor is only able to rotate in a single consistent direction 22, the profile of the side 56 of the retaining pin which does not contact the tilting pad 14 is of little significance.

Figure 6:
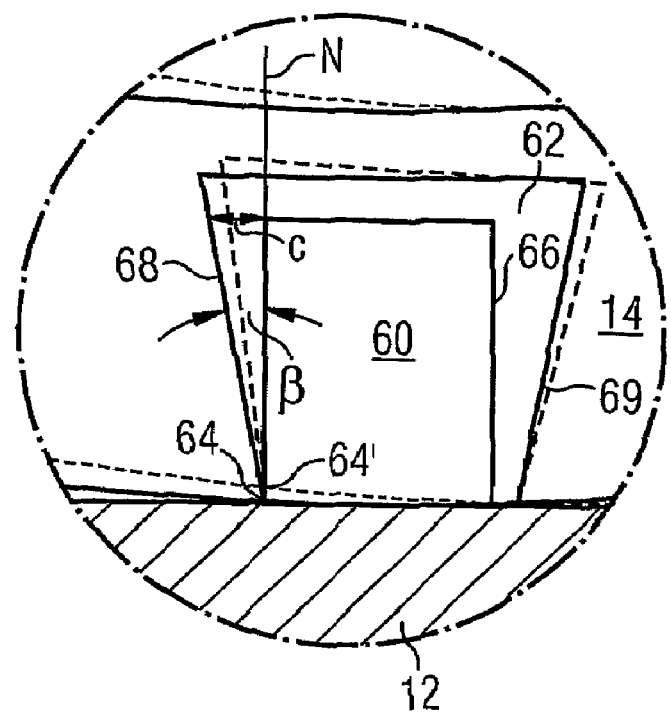

FIG. 6 illustrates an alternative embodiment of the present invention in a similar fashion to the detail shown in FIG. 5. A first position of the tilt pad 14 is shown in solid lines, while a second position of the tile pad is shown in dotted lines. A retaining pin 60, which may be parallel sided, or may be tapered in either sense, is located in a cavity 62 having divergent side walls 68, 69, which provide clearance c at the pin tip, while maintaining the point of contact 64 between retaining pin 60 and tilt pad 14 substantially at the base of the retaining pin 60, at the inner surface of the carrier 12, thereby achieving the objectives of the present invention.

The tilt pad tends to tilt in operation, depending on factors such as the speed of rotation of the rotor and unbalanced forces. The tilt pad may tilt from the position shown in a solid line towards the position shown as a dotted line. Due to the inventive profile of the cavity 62, the point of contact 64 seeks to move to a new location 64' with the tilting of the pad 14. In contrast to the prior art systems of FIGS. 2 and 4, and due to the inventive profile of the cavity 62, the point of contact is permitted to substantially take up the desired position 64'. The pad is accordingly able to tilt without being substantially displaced circumferentially about the carrier 12. Accordingly, the displacement of the tilt pad 14 to the position where the contact point is in position 64' is a simple rocking movement causing substantially no frictional movement between the pad 14 and the carrier 12.

Later, during operation of the rotor, the pad 14 may be called upon to tilt back to the position shown at 64. This will again be possible, due to the inventive profile of the cavity 62, without the pad being substantially displaced circumferentially about the carrier 12, and so also without a frictional displacement of the pad 14 on the carrier 12.

The retaining pin 60 and the cavity 62 may each be elongate in the axial direction of the bearing system. The cavity 28 may occupy only a part of the axial extent of the tilt pad 14, with the retaining pin 60 having a compatible axial dimension. The pin 50 may be pyramidal, cuboid or cylindrical in shape. Such pyramid may have a square or rectangular base. The pyramid may be truncated. The pin may be conical or truncated-conical in shape.

More than one such combination of cavity 62 and retaining pin 60 may be provided on each tilt pad. Such plurality of combinations of cavities and pins are preferably aligned in the axial direction of the pad 14 and the bearing 10.

The angle of the taper β of the profile of cavity 62, measured with reference to the normal N to the carrier 12 surface, is important. If the angle of taper β approaches too closely the normal N to the carrier 12, the trailing edge 68 of cavity 62 may contact the pin 60 at a radially inner point than points 64, 64' shown in FIG. 6. The tilt pad 14 may not be able to tilt without reintroducing a significant frictional displacement, impairing the achievements of the objectives of the invention. The lower limit to the taper angle β is thus provided by the requirement that the trailing edge 68 of cavity 62 should contact the pin 60 only substantially at the outer circumference of the tilt pad 14. If the trailing edge 68 contacts pin 60 at any radially inner point of pin 60, that is to say any deeper within cavity 62, then there is a risk that an unacceptable amount of frictional circumferential movement may be re-introduced, the problem of fretting wear will not be substantially alleviated, and the objectives of the present invention will not be achieved.

On the contrary, If the angle of taper β increases too far from the normal N to the carrier 12, the tilt pad 14 may travel a frictional distance in the same direction as the rotor movement when tilting. This would reintroduce a significant frictional displacement, impairing the achievements of the objectives of the invention.

The limits to the useful range of taper angles for the profile of the cavity 62 may be deduced by simple routine experiment, or by calculation.

The taper angles β on both sides of the profile of the cavity 62 are preferably equal, particularly in applications where the rotation direction 22 of the rotor may change. In applications where the rotor is only able to rotate in a single consistent direction 22, the profile of the side 66 of the retaining pin which does not contact the tilting pad 14 is of little significance.

Figure 7:
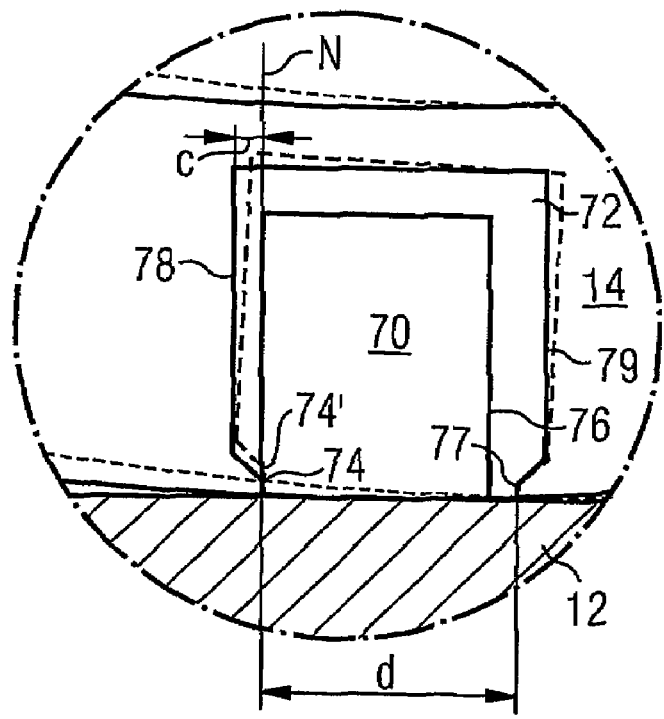

FIG. 7 illustrates a further embodiment of the invention. Similarly to the embodiment of FIG. 6, the opening to the cavity 72 is of smaller width d than the remainder of the cavity. However, the embodiment of FIG. 7 does not require the walls 78, 79 of the cavity 72 to taper. Rather, the cavity is arranged to have a lesser dimension d in a plane transverse to the axes of the bearing assembly and the tilt pad at the first location 54, than at all corresponding locations at radially inner portions of the side face 78, with respect to the first location 74. This embodiment also provides a clearance c at the tip of the retaining pin, while maintaining the point of contact 74 between retaining pin and tilt pad substantially at the inner surface of the carrier 12, thereby achieving the objectives of the present invention.

For an elongate cavity, the lesser dimension d may be achieved by machining an inward step 77 profile from solid, e.g. by routing. Particularly for a non-elongate cavity, the lesser dimension d might be achieved either by machining the inward step profile 77 from solid, or by counter-boring and pressing in a ring.

Figure 8:
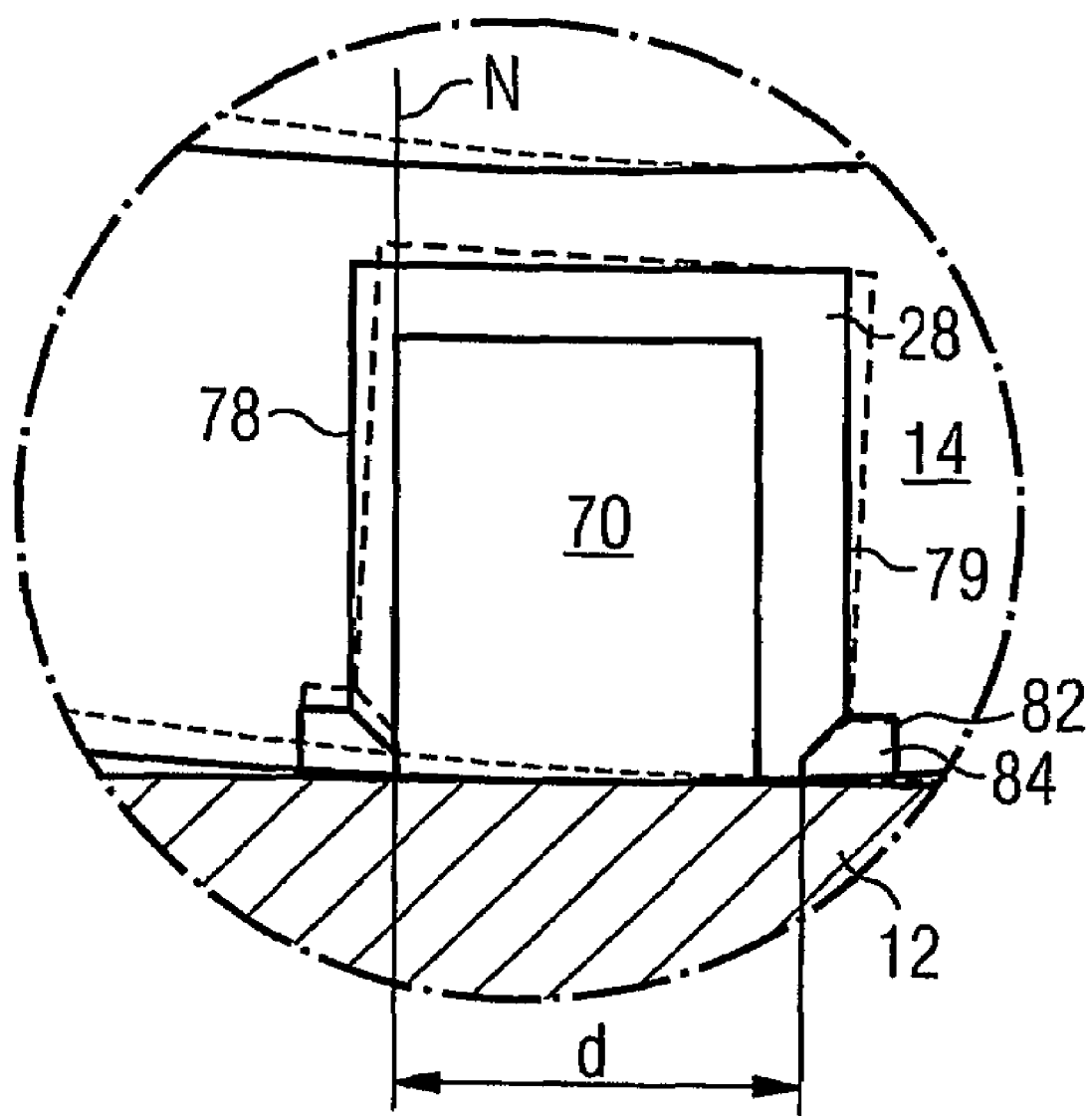

FIG. 8 illustrates more particularly an embodiment in which counterboring 82 has been used, and a ring 84 of lesser internal diameter d has been press-fitted, welded, brazed or otherwise attached into the enlarged counterbored region to provide the lesser dimension d.

The resultant structure operates in an identical fashion to that of FIG. 7, and corresponding reference labels are used to indicate corresponding features.

In the embodiments of FIGS. 7 and 8, either or both of the retaining pin 70 and the cavity walls 78, 79 may be tapered, or approximately normal N to the carrier 12 inner surface. The lesser dimension d may be provided by a tapered feature as illustrated, or by a feature of rectangular profile. In either case, the point of contact 74, 74' must be kept substantially at the inner surface of the carrier 12.

The invention accordingly provides a radial tilt pad bearing system which substantially alleviates the problem of fretting wear on tilt bearings as encountered with known radial tilt pad bearing systems. This advantage is achieved by the invention provision of a certain profile of retaining pin and/or cavity, as defined in the appended claims.

The invention claimed is:

1. A radial tilt pad bearing assembly comprising:
an outer carrier;
a plurality of tilt pads retained within the outer carrier; and
a corresponding plurality of retaining pins to retain the tilt pads in given circumferential positions, each fixed in the bearing assembly outer carrier so as to abut a side face of a cavity in the corresponding tilt pad and at least one retaining pin and the corresponding cavity are respectively shaped such that, when in use, a clearance in a plane transverse to the axes of the bearing assembly and the tilt pad between the retaining pin and the side face is lesser at a first location which lies substantially at the inner surface of the carrier, than at all corresponding locations at radially further inner portions of the side face, with respect to the first location,
wherein a contact point between the retaining pin and the tilt pad when in use, lies substantially at the inner surface of the outer carrier, and whereby the tilt pad is accordingly able to tilt without being substantially displaced circumferentially about the outer carrier.

2. The radial tilt pad bearing assembly according to claim 1, wherein the retaining pin has a tapered cross-section in a plane transverse to the axes of the bearing assembly and the tilt pad.

3. The radial tilt pad bearing assembly according to claim 2, wherein taper angles on both sides of the cross-section of the retaining pin are equal.

4. The radial tilt pad bearing assembly according to claim 1, wherein the cavity is shaped to have a lesser dimension in a plane transverse to the axes of the bearing assembly and the tilt pad at the first location than at all corresponding locations at radially inner portions of the side face with respect to the first location.

5. The radial tilt pad bearing assembly according to claim 4, wherein the cavity has a tapered cross-section in a plane transverse to the axes of the bearing assembly and the tilt pad.

6. The radial tilt pad bearing assembly according to claim 5, wherein taper angles on both sides of the cross-section of the cavity are equal.

7. The radial tilt pad bearing assembly according to claim 1, wherein the retaining pin and the cavity are each elongate in the axial direction of the tilt pad and the bearing assembly.

8. The radial tilt pad bearing assembly according to claim 1, wherein the cavity occupies only a part of the axial extent of the tilt pad and the retaining pin has a compatible axial dimension.

9. The radial tilt pad bearing assembly according to claim 1, wherein the retaining pin is pyramidal in shape.

10. The radial tilt pad bearing assembly according to claim 9, wherein the pyramid has a square or rectangular base.

11. The radial tilt pad bearing assembly according to claim 9, wherein the pyramid is truncated.

12. The radial tilt pad bearing assembly according to claim 1, wherein the retaining pin is conical or truncated-conical in shape.

13. The radial tilt pad bearing assembly according to claim 1, wherein more than one combination of cavity and pin are provided on each tilt pad aligned in the axial direction of the pad and the bearing assembly.

* * * * *